United States Patent [19]
Miller

[11] Patent Number: 5,583,972
[45] Date of Patent: Dec. 10, 1996

[54] 3-D WEATHER DISPLAY AND WEATHERCAST SYSTEM

[76] Inventor: Richard L. Miller, 2211 Saxon, Houston, Tex. 77018

[21] Appl. No.: 192,492

[22] Filed: Feb. 7, 1994

Related U.S. Application Data

[63] Continuation-in-part of Ser. No. 101,548, Aug. 2, 1993.

[51] Int. Cl.$^6$ .................................................. G06T 15/00
[52] U.S. Cl. ............................ 395/119; 324/640; 342/26; 342/59
[58] Field of Search ............................... 395/119, 126, 395/130, 131; 342/26, 59, 460; 324/640

[56] References Cited

U.S. PATENT DOCUMENTS

| | | | |
|---|---|---|---|
| 4,873,481 | 10/1989 | Nelson et al. | 324/640 |
| 5,135,397 | 8/1992 | Yen | 434/2 |
| 5,281,815 | 1/1994 | Even-Tov | 250/339 |
| 5,339,085 | 8/1994 | Katoh et al. | 342/180 |
| 5,363,475 | 11/1994 | Baker et al. | 395/122 |
| 5,379,215 | 1/1995 | Kruhoeffer et al. | 364/420 |

OTHER PUBLICATIONS

Nimersheim, J., "Accu–Weather Forecaster 1.0", Product Review, Apr. 1993.
Richard, P., "Thunderstorm Monitoring and Lightning Warning, Operational Applications of the SAFIR System", Ground Conference on Lightning and Static Electricity, vol. 1, Aug. 91.

*Primary Examiner*—Mark K. Zimmerman
*Attorney, Agent, or Firm*—J. M. Gilbreth

[57] ABSTRACT

A weathercasting system for displaying dynamic real time photo-realistic three-dimensional pictorial representations of weather conditions created from meteorological data combined with geographical and topographical data. Geographical and topographical data is retrieved, digitized, and processed to produce a simulated three-dimensional volumetric image and stored in memory for later retrieval. Meteorological data including precipitation, cloud cover data, the bottom and top of cloud formations, and reflectivity and velocity of rain droplets in real-time are acquired from C-band and/or K-band Doppler radar, or non-Doppler K-band and Doppler X-band radar installations which ameliorate S-band radar data and the data is digitized and processed to produce a simulated three-dimensional image of the meteorological data. The meteorological data is combined with the geographical and topographical data to produce a digital signal capable of being transmitted to a computer, displayed on a computer display screen, and manipulated by peripheral devices connected with the computer. The combined data is displayed as a photo-realistic three-dimensional pictorial representation of weather conditions from a selective observation point and relative to a selective geographical area. The pictorial representation can be manipulated to give the visual effect of moving through a weather system to allow the viewer to visualize the effects of the weather system at various geographical locations.

30 Claims, 2 Drawing Sheets

3-D WEATHER DISPLAY AND WEATHERCAST SYSTEM

CROSS REFERENCE TO RELATED APPLICATION

This application is a continuation-in-part of U.S. patent application Ser. No. 08/101,548, filed Aug. 2, 1993, pending.

BACKGROUND OF THE INVENTION

1. Field of the Invention

This invention relates generally to weather broadcasting and display systems, and more particularly to a 3-D weather display and weathercast system utilizing real-time three-dimensional representations of meteorological data including radar gathered data combined with geographical and topographical data for television broadcasts of simulated weather patterns in three dimensions.

2. Brief Description of the Prior Art

For many years people have relied on weather broadcasts to help plan their lives. According to Robert Henson in his book, *Television Weathercasting: A History*, weather "consistently ranks as the top draw in both local and national news (when featured in the latter)." According to a poll conducted by the National Oceanic and Atmospheric Administration in 1980, weather was "the major reason that people watch the news programs".

The field of meteorology has seen significant technological advances in the past ten years. New and innovative devices such as infrared satellites, wind and temperature profilers, thunderstorm detectors, all-sky cameras, Doppler radars and LIDAR have all helped meteorologists better understand and predict weather.

However, despite public interest and technological advances, the weather display seen by television viewers has not changed significantly over the years. In nearly all television broadcasts, weather data is presented as a flat, 2-D (two dimensional) map overlay. In the mid 1970's, "color-radar" was introduced, which differentiates areas of precipitation using a color-coding scheme. Patches of heavy rain, snow or hail are all depicted the same way: in red. Lighter areas of precipitation are represented in shades of blue or green.

The typical current weathercast display represents the weather symbolically rather than realistically and usually only shows the general air temperature and where it is raining. In some instances, a superimposed satellite display of fluffy cloud patterns is shown moving along over the flat map from an exaggerated height observation point. The "blue screen" display behind the announcer still usually shows the familiar two-dimensional patchwork rainfall amounts in red, green and blue. The satellite imagery displayed on the evening broadcast may be anywhere from a half-hour to four hours old.

Clearly, current weather broadcasting is not done in "real-time" and cannot be considered "nowcasting". This is demonstrated with each major storm. Weather forecasts become "aftercasts" as footage is shown of wrecked buildings and overturned vehicles. Even when the storm is as large as a hurricane, television weathercasters usually can only base their damage information on scattered eyewitness reports.

Significant also is the information that is absent from the conventional weathercast display, such as: (1) the type of precipitation, (2) the strength and location of wind shear, (3) the presence of tornadic signatures showing rapid circular motion, (4) the location of updraft vault, (5) the location of wall clouds, (6) the location of heavy lightning activity, and (7) the wind direction on the ground.

The National Weather Service has a network of advanced S-Band Doppler radar stations in place at 138 sites in the United States, and is capable of delivering 77 different products to government meteorologists. These products include; winds aloft, lightning activity and wind shear conditions, such as microburst activity. However, of these 77 products, only 11 are commercially available through contract with several private weather service companies which act as intermediaries between the National Weather Service and the public. These companies charge for the use of these eleven products and, in order to receive the latest radar (NEXRAD) information from a particular site, a private individual or company would first have to install an expensive downlink microwave unit and file server, and would have to pay a monthly fee to receive the radar signal.

There are several patents which disclose various systems of three-dimensional representation of topographical data and meteorological data for pilots and flight simulators used in pilot training.

Manelphe, U.S. Pat. No. 5,077,609 discloses an optoelectric system of assistance in attack and navigational missions which provides a three-dimensional localization of a point of interest for a navigational resetting operation or for a firing control operation.

Yen, U.S. Pat. No. 5,135,397 discloses a 3-D weather simulation system used with a four channel digital radar landmass simulator (DRLMS) for flight simulators which integrates culture, elevation, aspect, and weather. Weather maps can be loaded into the system as weather patterns and can be expanded, rotated, and translated. Weather mass is simulated in three dimensions, i.e., having a bottom and height. Implementation entails the full or partial occultation of terrain and targets by weather, and vice versa.

The present invention is distinguished over the prior art in general, and these patents in particular by a weather-casting system for displaying dynamic real time photo-realistic three-dimensional pictorial representations of weather conditions created from meteorological data combined with geographical and topographical data. Geographical and topographical data is retrieved, digitized, and processed to produce a simulated three-dimensional volumetric image and stored in memory for later retrieval. Meteorological data including precipitation, cloud cover data, the bottom and top of cloud formations, and reflectivity and velocity of rain droplets in real-time are acquired from C-band and/or K-band Doppler radar, or non-Doppler K-band and Doppler X-band radar installations which ameliorate S-band radar data and the data is digitized and processed to produce a simulated three-dimensional image of the meteorological data. The meteorological data is combined with the geographical and topographical data to produce a digital signal capable of being transmitted to a computer, displayed on a computer display screen, and manipulated by peripheral devices connected with the computer. The combined data is displayed as a photo-realistic three-dimensional pictorial representation of weather conditions from a selective observation point and relative to a selective geographical area. The pictorial representation can be manipulated to give the visual effect of moving through a weather system to allow the viewer to visualize the effects of the weather system at various geographical locations.

SUMMARY OF THE INVENTION

It is therefore an object of the present invention to provide a photo-realistic 3-D weather display system utilizing real-time three-dimensional representations of combined meteorological data including radar gathered data and topographical data for television broadcasts of simulated weather patterns.

It is another object of this invention to provide a 3-D weather display system for television broadcasts in real-time whereby the public can be made aware of severe weather as it is happening.

Another object of this invention to provide a 3-D weather display system for television broadcasts which will recognize dangerous microweather systems such as microbursts and tornadoes and accurately chart them to within 150 meters as they are occurring.

Another object of this invention to provide a 3-D weather display system for television broadcasts utilizing three-dimensional modeling of mesoscale and microscale weather systems which will give the audience a more accurate view of weather patterns.

Another object of this invention is to provide a 3-D weather display system for television broadcasts utilizing three-dimensional modeling to add novel entertainment value to traditional news and weather broadcasts.

A further object of this invention is to provide a 3-D weather display system for television broadcasts utilizing C-band and/or K-band Doppler radar, or non-Doppler K-band and Doppler X-band radar units, signal processors, and high-speed communication links which ameliorate S-band radar data and will provide data that is superior to current 2-D systems.

A still further object of this invention is to provide a 3-D weather display system for television broadcasts which, once in place, can be upgraded easily and inexpensively.

Other objects of the invention will become apparent from time to time throughout the specification and claims as hereinafter related.

The above noted objects and other objects of the invention are accomplished by a weathercasting system for displaying dynamic real time photo-realistic three-dimensional pictorial representations of weather conditions created from meteorological data combined with geographical and topographical data. Geographical and topographical data is retrieved, digitized, and processed to produce a simulated three-dimensional volumetric image and stored in memory for later retrieval. Meteorological data including precipitation, cloud cover data, the bottom and top of cloud formations, and reflectivity and velocity of rain droplets in real-time are acquired from from C-band and/or K-band Doppler radar, or non-Doppler K-band and Doppler X-band radar installations which ameliorate S-band radar data and the data is digitized and processed to produce a simulated three-dimensional image of the meteorological data. The meteorological data is combined with the geographical and topographical data to produce a digital signal capable of being transmitted to a computer, displayed on a computer display screen, and manipulated by peripheral devices connected with the computer. The combined data is displayed as a photo-realistic three-dimensional pictorial representation of weather conditions from a selective observation point and relative to a selective geographical area. The pictorial representation can be manipulated to give the visual effect of moving through a weather system to allow the viewer to visualize the effects of the weather system at various geographical locations.

DESCRIPTION OF THE PREFERRED EMBODIMENT

Figure 1:
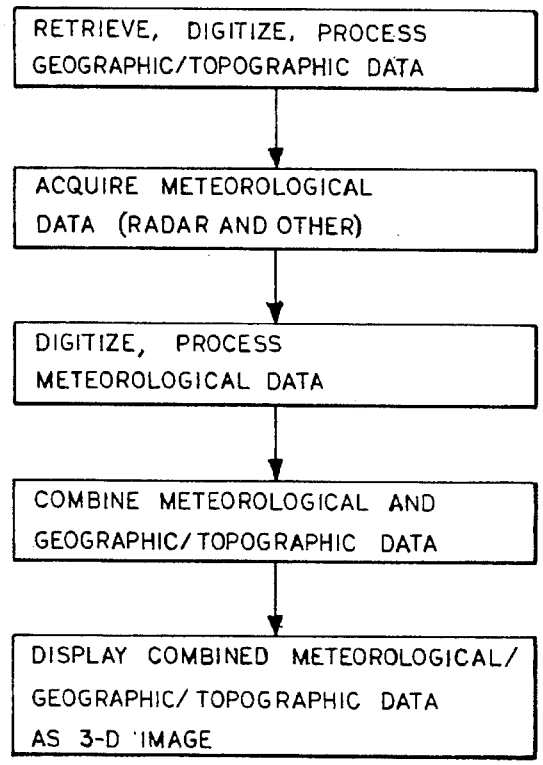
FIG. 1 is a block diagram illustrating the basic stages of obtaining and processing weather data in accordance with the present method.
Figure 3:
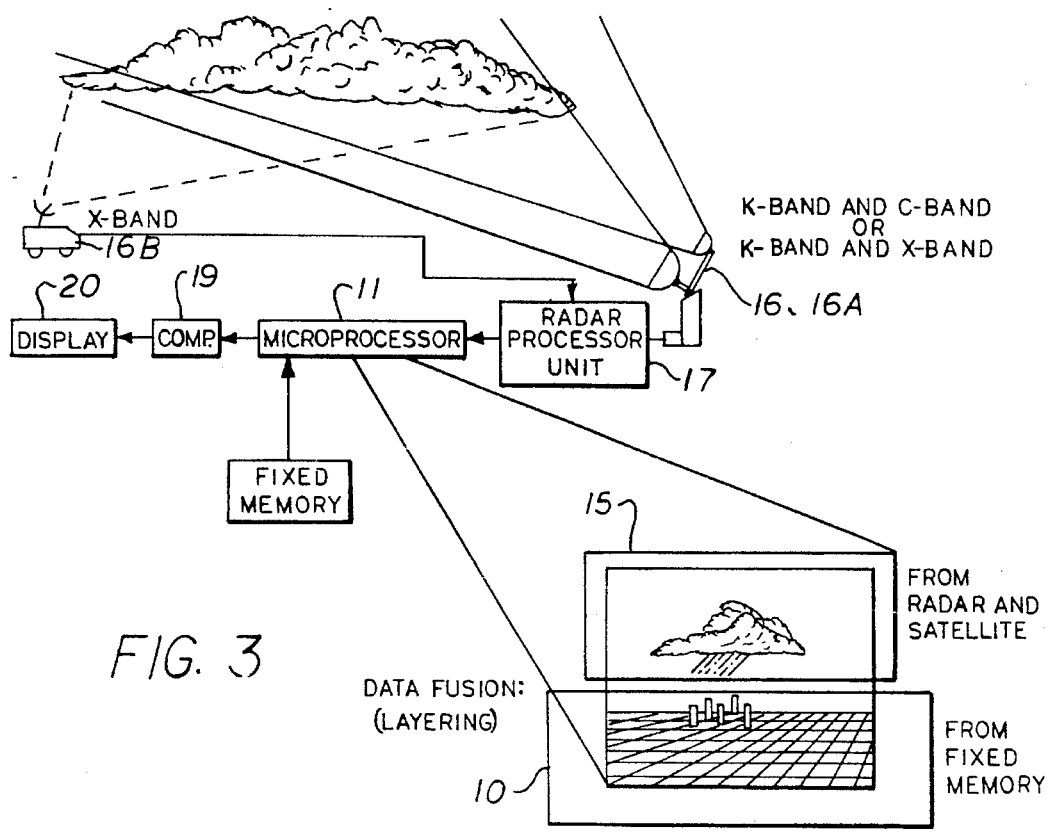
FIG. 3 is a schematic illustration illustrating schematically the fusing of the weather data images with the geographical and topographical data images.
Figure 2:
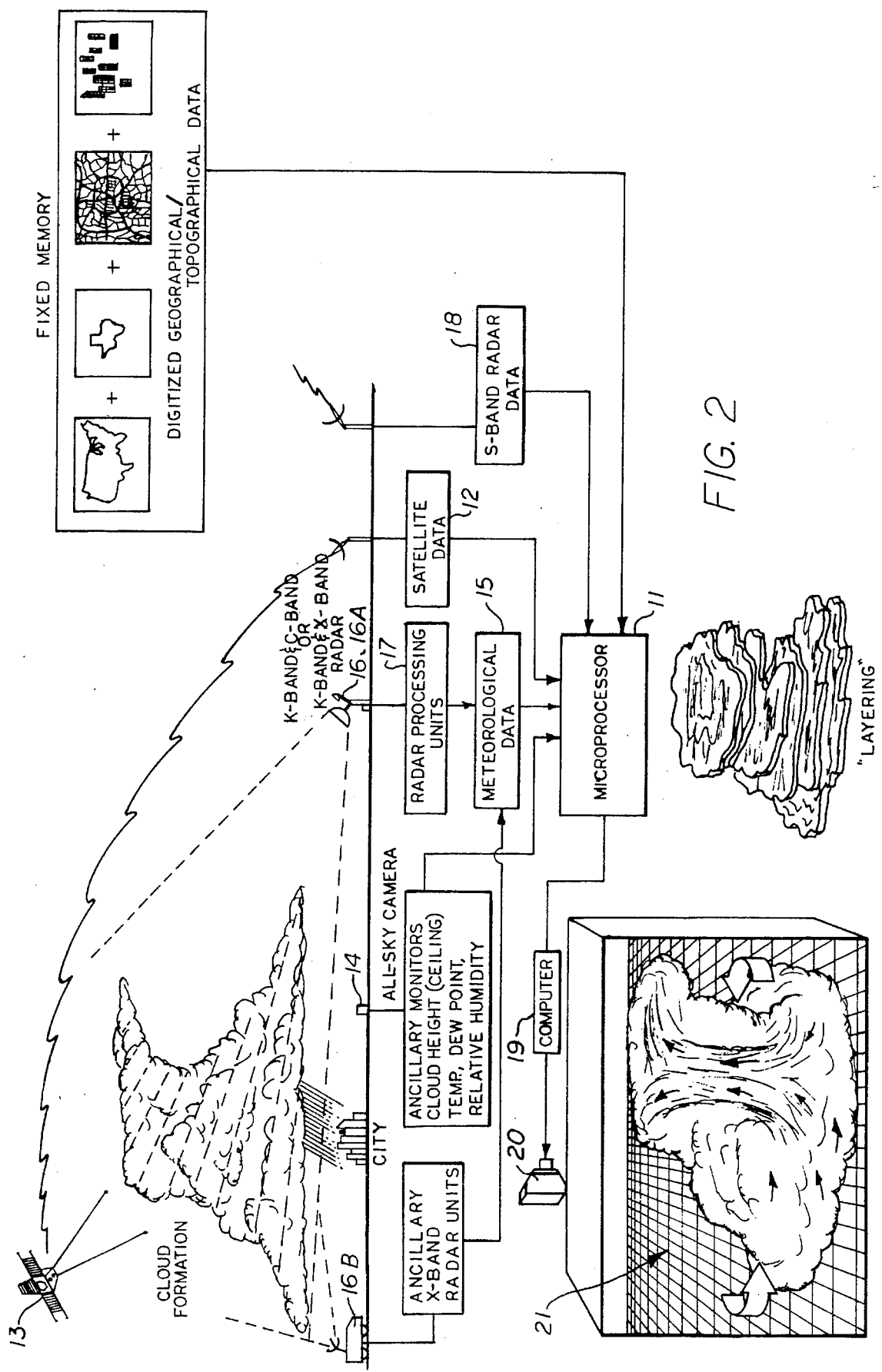
FIG. 2 is a schematic illustration showing the components of the present 3-D weather display system.

Referring to the drawings by numerals of reference, there is shown in block diagram in FIG. 1, the basic stages of obtaining and processing weather data in accordance with the present method. FIG. 2 illustrates the major components of the system, and FIG. 3 illustrates schematically the fusing of the weather data images with the geographical and topographical data images.

The present system incorporates five stages for obtaining and processing the weather data; (1) geographical and topographical data retrieval, (2) meteorological data acquisition, (3) data fusion of the meteorological and geographical data, (4) post-fusion data processing, and (5) graphic display.

In the first stage, geographical and other topographical data 10 on a national, regional, and local scale is digitized from satellite photo-images and stored in fixed memory by microprocessor 11 and is accessed and retrieved as needed while the method is in use. In the preferred embodiment, digital Landsat images and other digitally-constructed environments are processed to produce a simulated 3-D volumetric display having a volume of 50 km×50 km by 20 km in height. Texture-mapping and similar techniques are used to accurately simulate the city environment and local terrain associated with the broadcast, including high resolution computerized simulation of local buildings, highways and landmarks. Cloud height information 12 and infrared data is obtained from a geostationary weather satellite 13. Color and texture-mapping information for cloud simulation is obtained from all-sky cameras 14 having beams-splitters and digital zoom capabilities.

By using instruments such as all-sky cameras, the microprocessor will also be able to texture-map and even color the clouds to correspond to actual conditions. For example, if there are dark blue rain clouds in the east and high western cirrus tinged red by the setting sun, the microprocessor 11 will be able to reproduce these colors accurately in the display. The scenes are recorded digitally, converted from polar to cartesian coordinates, then sent to the microprocessor 11 for data fusion with other data. The geographical and topographical information may be stored on tape and or disc and will not change appreciably. The weather, however, will be "volatile," based upon current satellite and radar data.

In the second stage, meteorological data 15 is obtained in real-time using C-band and/or K-band Doppler radar units 16 operated from at least one location and in conjunction with the weather satellite 13. Both C-band and K-band radar, or K-band and X-band radar are used to provide both precipitation and cloud cover data. Ancillary meteorological data, such as cloud height, temperature, humidity, and dew point, may be obtained by non-radar measurements, such as the all-sky camera 14.

As shown in FIG. 2, each installation has two radar units, one C-band radar unit linked with one K-band unit, or one K-band unit linked with an X-band unit. This is to facilitate acquisition of data representing both cloud bottoms and tops as well as precipitation. The C-band radar has a 5.4 cm wavelength and covers a 15–30 km radius area. The K-band radar includes several ranges of wavelengths. The KA-band is from 0.75–1.2 cm wavelength, generally, 0.87 cm. The K-band is from 1.2–1.7 cm wavelength, covers a 10 km radius, and will delineate cloud borders for all except cirrus clouds. The KU-band is from 1.7–2.5 cm wavelength.

The preferred radar units 16 are KU-band and C-band Doppler meteorological surveillance radars with automatic computer processing systems 17 and ground clutter suppression. These radar units provide measurement of both reflectivity and velocity of rain droplets and can scan volumetrically to produce high-quality images. In the reflectivity mode, the rain droplet echoes are scaled to correspond directly to values of rainfall intensity or rainwater content. In velocity mode, the radar measures the movement of scattering particles along the radar beam. In addition, special lightning detection software and algorithms may be incorporated with the C-band radar (5.4 cm wavelength) to forecast lightning hazards. The radar automatic computer processing system 17 handles radar control, user interface and real-time display tasks. Base parameters, such as mean velocity, reflectivity and spectral width can be automatically displayed and archived on disk. The radar computer processing system 17 also allows playback capability for off-line analysis.

To provide instantaneous wind velocities inside the storm, and to maintain picture integrity during heavy rainfall (greater than 8" per hour), the system may be modified as follows. The Doppler C-band and Doppler K-band stationary radar installation is replaced with a standard (non-Doppler) K-band radar unit combined with a Doppler X-band unit 16A. The data from this stationary site is combined with data from one or more truck-mounted mobile X-band radar units 16B fitted with global positioning devices. Alternatively, the ancillary Doppler X-band units may be located at fixed points at the periphery of the central area. The data from the ancillary X-band units is digitally combined with the K-band and X-band data from the stationary source as well as other ancillary information, and then sent to a computer, as described below.

The data supplied by the C-band, K-band, and X-band radar units may be supplemented by S-band radar data 18 supplied by National Weather Service radar units to provide a picture of the weather in a radius of 250 nautical miles surrounding the installation. The National Weather Service has a network of advanced S-Band Doppler radar stations in place at 138 sites in the United States, and is capable of delivering 77 different data products to government meteorologists. The data products include; winds aloft, lightning activity and wind shear conditions such as microburst activity. Out of these 77 products, 11 are allowed to be received by the public which include four tilts or "slices" of the atmosphere in clear air mode and eleven slices of the atmosphere in storm mode. For example, the S-band radar at the National Weather Service facility at LaMarque, Texas has a range of approximately 250–300 nautical miles in clear air mode and 125 nautical miles in storm mode. In storm mode, the top slice of the atmosphere is taken from a tilt of 19.5° which, according to meteorologists, will include clouds at 40,000' over Houston, some 40 miles away.

The 11 data products from the National Weather Service are commercially available through private weather service companies, called "NIDS vendors" which act as intermediaries between the National Weather Service and the public.

The acquisition of the 11 data products at a particular site requires a downlink microwave unit and file server.

In the preferred embodiment, the present system would utilize the following National Weather Service data products to supplement the C-band, K-band, and X-band radar data:

| Product # | Product ID | Product |
|---|---|---|
| 19 | R | Reflectivity (4 lowest tilts) |
|  | CR | Composite reflectivity |
| 36 | CR | Clear air mode |
| 38 | CR | Precipitation mode |
| 41 | ET | Echo tops |
| 57 | VIL | Vertical integrated liquid |
| 78 | OHP | Surface rainfall accumulation/ 1 hr running total |
| 79 | THP | Surface rainfall accumulation/ 3 hr total |
| 80 | STP | Surface rainfall accumulation/ Storm total |
| 81 | DPA | Hourly digital rainfall array product |
| 27 | V | Radial velocity (4 lowest tilts) |
| 48 | VWP | Velocity azimuth display (VAD) winds (time vs height) Layer composite reflectivity |
| 65 | LRM | Low layer |
| 66 | LRM | Middle layer |
| 90 | LRM | High layer |
| 75 | FTM | Free text message (instrumentation messages) |

The digital signal microprocessor 11 analyzes the radar information from the eleven slices of the atmosphere and, using algorithms, construct virtual surfaces connecting the various "edges" of the data. The more accurate C-band, K-band, and X-band radar data allows the microprocessor 11 to construct more accurate and smoother surfaces for clouds over a metropolitan area. The processed radar information is compressed and transmitted to a receiving station over 9600-baud rate phone lines or fiber-optic cable using conventional advanced communication devices.

In the third stage, the acquired meteorological data 15 is fused or combined with retrieved geographical and topographical data 10 using parallel processing techniques. The Doppler radar data may be pre-processed before fusion. The data is fused or combined with the 3-D volumetric display in the microprocessor array to produce a digital signal which is sent to a computer 19, such as a Silicon Graphics computer equipped with an advanced display system 20.

In the fourth stage, the fused or combined meteorological data and geographical/topographical data is processed, using a software program, to generate a three-dimensional graphical representation of the data. In the preferred embodiment, the basic weather information is used to form a real-time 3-D graphic using a software program, such as "VIZ 5-D" software developed by the University of Wisconsin's Space Science And Engineering Center. For extreme and rapidly changing weather conditions, the software can be used to provide a photo-realistic view of the surrounding weather. The preferred software also makes use of texture-mapping and transparency volumes.

The processor systems 11 and 19 utilized in processing the fused or combined meteorological data and geographical/topographical data and generate the three-dimensional graphical representation comprises: (1) a radar ingest/formatting processor; (2) A 3-D display previewer based on the software display system which would generate an animation script; and (3) A high-quality rendering program which would use the script to generate a near-photo-realistic version of the display with processing times in the ten to twenty minute range.

In the fifth stage, the three-dimensional graphical representation of the fused or combined data is displayed in two-dimensions in "real-time". "Real-time display" for purposes of the present system is defined as display within approximately 20 minutes of acquiring meteorological data. The graphical representation is displayed relative to a selective "observation point" and dynamically controlled with respect to geographical and topographical data by a peripheral device, such as a mouse, to give the effect of "moving through" weather systems to see their effects at various geographical locations. After the weather broadcaster has arranged the scene to his liking, the microprocessors map the scene using ray-tracing and other advanced procedures. The resultant photo-realistic graphic scene will be processed and viewed within ten minutes of real time.

In most instances, the ten-minute lag will not be of major consequence, and the resultant image will accurately represent the real-time weather patterns over a 50 kilometer by 50 kilometer area to a height of 20 kilometers. Once the virtual volume is visualized, the television viewers may "fly" from, say, western Washington state to the Houston, Tex. area at a virtual speed of 240,000 miles per hour, crossing several real-time storm systems. Below the viewers observation point, the landscape will be an accurate representation of the actual terrain of the local area to a resolution of 90 meters.

While "flying" over the 3-D simulated terrain, the viewer may cross over a high pressure area or travel along a storm front. The primary purpose of the trip, however, is to end up in the local region. There, the terrain resolution increases considerably, due to the computerized simulation of local buildings, highways and landmarks.

In the local area, the resolution of the volatile information is also increased due to the location of the radar units. Since each radar unit employs relatively short wavelengths (1 cm and 5 cm) and short range gates (150–300 m), it will be possible to visualize clouds as small as 300–600 ft. The cloud colors will also correspond to actual conditions. For example, if there are dark blue rain clouds in the east and high western cirrus tinged red by the setting sun, the viewer will be able to see these colors.

Should a thunderstorm enter the area, the radar system will be able to actually produce a 3-D "x-ray" of the storm itself. Using simple graphic techniques, the different storm structures can be visualized based upon radar reflectivity. All areas can be easily represented: the updraft vault, wall cloud and rain zones. The Doppler radar would be able to detect the characteristic "hook" shape associated with tornadic rotation many minutes before the tornadoes touch the ground. The observer will be able to visualize the information in 3-D.

Thus, broadcasters will be able to not only tell about storm activity, they will be able to show viewers-giving them a tour of the thunderstorm in real time. Suppose, for example, during a thunderstorm over Houston, circular motion begins to occur 1000 feet above the ground over the corner of Smith Street and Elm Drive. The broadcaster would have the raw data and be able to zoom in on the structure, examine it and then warn viewers.

During a hurricane, the viewers will be able to "see" the structure of the storm on their television screen, then perhaps travel down into the eye and through the wall of the hurricane. Intense updrafts, vortices and tornadic activity can be identified through visualization of Doppler images. For the first time, viewers will actually see what is going on in the air above them.

Rainfall intensities can also be determined and modeled using layering techniques, thus giving important information on potential flooding. This same technique can be ported to another real-time problem associated with urban life: reporting and visualization of traffic tie-ups.

The present system provides exceptional data and graphics, far beyond what is now offered on television weathercasts.

While this invention has been described fully and completely with special emphasis upon a preferred embodiment, it should be understood that within the scope of the appended claims the invention may be practiced otherwise than as specifically described herein.

I claim:

1. A method of displaying dynamic three-dimensional pictorial representations of weather conditions created from meteorological data combined with geographical and topographical data, comprising the steps of:

retrieving, digitizing, and processing geographical and topographical data to produce a simulated three-dimensional volumetric image having a predetermined volume, and storing the digitized and processed data in memory means for later retrieval;

acquiring meteorological data comprising precipitation, cloud cover data, the bottom and top of cloud formations, and reflectivity and velocity of rain droplets, in real time from radar installations, wherein the radar installations comprise K-band or K-band Doppler radar and at least one of C-band radar, C-band Doppler radar, S-band radar, S-band Doppler Radar, X-band radar and X-band Doppler radar;

digitizing and processing said acquired meteorological data to produce a simulated three-dimensional image of said meteorological data;

combining the acquired meteorological data with the retrieved geographical and topographical data utilizing microprocessor means to produce a digital signal capable of being transmitted to a computer, displayed on a computer display screen, and manipulated by peripheral devices connected with the computer; and displaying the combined processed meteorological data and geographical and topographical data as a three-pictorial representation of weather conditions from a selective observation point and relative to a selective geographical area.

2. The method according to claim 1 in which the step of displaying the combined processed meteorological data and geographical and topographical data as a three-dimensional pictorial representation of weather conditions is accomplished within approximately twenty minutes of acquiring said meteorological data.

3. The method according to claim 1 in which said three-dimensional pictorial representation of weather conditions is manipulated by a peripheral device connected with the computer from a selective observation point and relative to a selective geographical area to give the visual effect of moving through a weather system to allow the viewer to visualize the effects of the weather system at various geographical locations.

4. The method according to claim 1 in which said step of acquiring meteorological data comprises mobile X-band radar or mobile X-band Doppler radar.

5. The method according to claim 4 in which said step of acquiring meteorological data includes acquiring data from both K-band radar and X-band Doppler radar operated from at least one location.

6. The method according to claim 4 in which
said step of acquiring meteorological data includes acquiring data from both S-band Doppler radar and K-band Doppler radar operated from at least one location.

7. The method according to claim 4 in which
said step of acquiring meteorological data includes acquiring data from both C-band and K-band Doppler radar operated from at least one location.

8. The method according to claim 1 in which
said step of acquiring meteorological data includes utilizing lightning detection means in conjunction with said data selected from the recited radar group to acquire data representing lightning activity for forecasting lightning hazards.

9. The method according to claim 1 in which
said step of acquiring meteorological data includes utilizing a weather satellite in conjunction with said data selected from the recited radar group to acquire data representing cloud height, temperature, humidity, and dew point.

10. The method according to claim 1 in which
said step of acquiring meteorological data includes utilizing an all-sky camera in conjunction with said data selected from the recited radar group to acquire data representing cloud height, temperature, humidity, and dew point.

11. The method according to claim 1 in which
said step of digitizing and processing said acquired meteorological data to produce a simulated three-dimensional image of said meteorological data includes scaling said reflectivity of rain droplets to correspond directly to values of rainfall intensity or rainwater content.

12. The method according to claim 1 in which
said step of retrieving, digitizing, and processing geographical and topographical data includes retrieving photo-images of a national, regional, and local area from an overhead satellite.

13. The method according to claim 12 in which
said photo-images of said local area include computerized simulations of local buildings, highways and landmarks.

14. The method according to claim 12 in which
said step of retrieving, digitizing, and processing geographical and topographical data includes texture-mapping said photo-images to accurately simulate said national, regional, and local areas.

15. The method according to claim 1 in which
said step of digitizing and processing said acquired meteorological data to produce a simulated three-dimensional image of said meteorological data includes colorizing and texture-mapping said meteorological data to simulate actual weather conditions.

16. A weathercasting system for displaying dynamic real time three-dimensional pictorial representation of weather conditions created from meteorological data combined with geographical and topographical data, comprising:

processor for retrieving, digitizing, and processing geographical and topographical data to produce a simulated three-dimensional volumetric image having a predetermined volume;

memory for storing the digitized and processed geographical and topographical data for later retrieval;

accessor for accessing radar meteorological data comprising precipitation, cloud cover data, the bottom and top of cloud formations, and reflectivity and velocity of rain droplets, wherein the accessor Comprises radar installations comprising K-band or K-band Doppler radar and at least one of C-band radar, c-band Doppler radar, S-band radar, S-band Doppler Radar, X-band radar and X-band Doppler radar;

retriever for synchronously and continuously retrieving said radar meteorological data in real time;

digitizer for digitizing and processing said retrieved radar meteotological data to produce a simulated three-dimensional image of said radar meteorolgical data;

microprocessor for combining said digitized retrieved meteorological data with said digitized retrieved geographical and topographical data and producing a digital signal capable of being transmitted to a computer, displayed on a computer display screen, and manipulated by peripheral devices connected with the computer; and display for receiving and displaying said combined digitized meteorological data and geographical and topographical data as a three-dimensional pictorial representation of weather conditions from a selective observation point and relative to a selective geographical area.

17. The weathercasting system according to claim 16 including manipulator connected with said microprocessor means for manipulating said three-dimensional pictorial representation of weather conditions from a selective observation point and relative to a selective geographical area to give the visual effect of moving through a weather system to allow the viewer to visualize the effects of the weather system at various geographical locations.

18. The weathercasting system according to claim 16 in which said accessor for accessing radar meteorological data comprises mobile X-band radar or mobile X-band Doppler radar.

19. The weathercasting system according to claim 18 in which said accessor for accessing radar meteorological data includes a K-band radar unit and an X-band Doppler radar unit operated from at least one location.

20. The weathercasting system according to claim 18 in which said accessor for accessing radar meteorological data includes a K-band Doppler radar unit operated from at least one location.

21. The weathercasting system according to claim 18 in which said accessor for accessing radar meteorological data includes both an S-band Doppler radar unit and a K-band Doppler radar unit operated from at least one location.

22. The weathercasting system according to claim 18 in which said accessor for accessing radar meteorological data includes both a C-band Doppler radar unit and a K-band Doppler radar unit operated from at least one location.

23. The weathercasting system according to claim 18 in which said accessor for accessing radar meteorological data includes lightning detection and analysis means in combination with said at least one radar unit for acquiring and analyzing data representing lightning activity and forecasting lightning hazards.

24. The weathercasting system according to claim 18 in which said accessor for accessing radar meteorological data includes a weather satellite in combination with said at least one radar unit to provide data representing cloud height, temperature, humidity, and dew point.

25. The weathercasting system according to claim 18 in which said accessor for accessing radar meteorological data includes an all-sky camera in combination with said at least one radar unit to provide data representing cloud height, temperature, humidity, and dew point.

26. The weathercasting system according to claim 16 in which said digitizer for digitizing and processing said retrieved radar meteorological data to produce a simulated three-dimensional image of said meteorological data includes means for scaling said reflectivity of rain droplets to correspond directly to values of rainfall intensity or rainwater content.

27. The weathercasting system according to claim 16 in which said retriever for retrieving, digitizing, and processing geographical and topographical data includes means for retrieving photo-images of a national, regional, and local area from an overhead satellite.

28. The weathercasting system according to claim 27 in which said photo-images of said local area are processed to include computerized simulations of local buildings, highways and landmarks.

29. The weathercasting system according to claim 27 in which said retriever for retrieving, digitizing, and processing geographical and topographical data includes means for texture-mapping said photo-images to accurately simulate said national, regional, and local areas.

30. The weathercasting system according to claim 16 in which said digitizer for digitizing and processing said radar meteorological data to produce a simulated three-dimensional image of said radar meteorological data includes means for colorizing and texture-mapping said radar meteorological data to simulate actual weather conditions.

* * * * *